Figure 3:
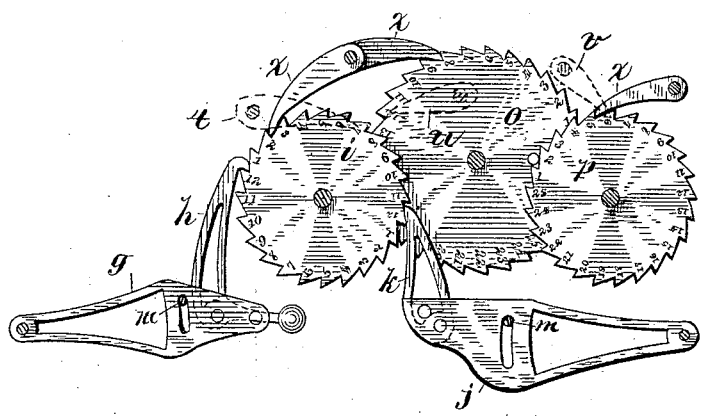

(No Model.)  2 Sheets—Sheet 1.
H. SCHELLENBERG & E. STIEMKE.
EGG REGISTER.
No. 333,678. Patented Jan. 5, 1886.
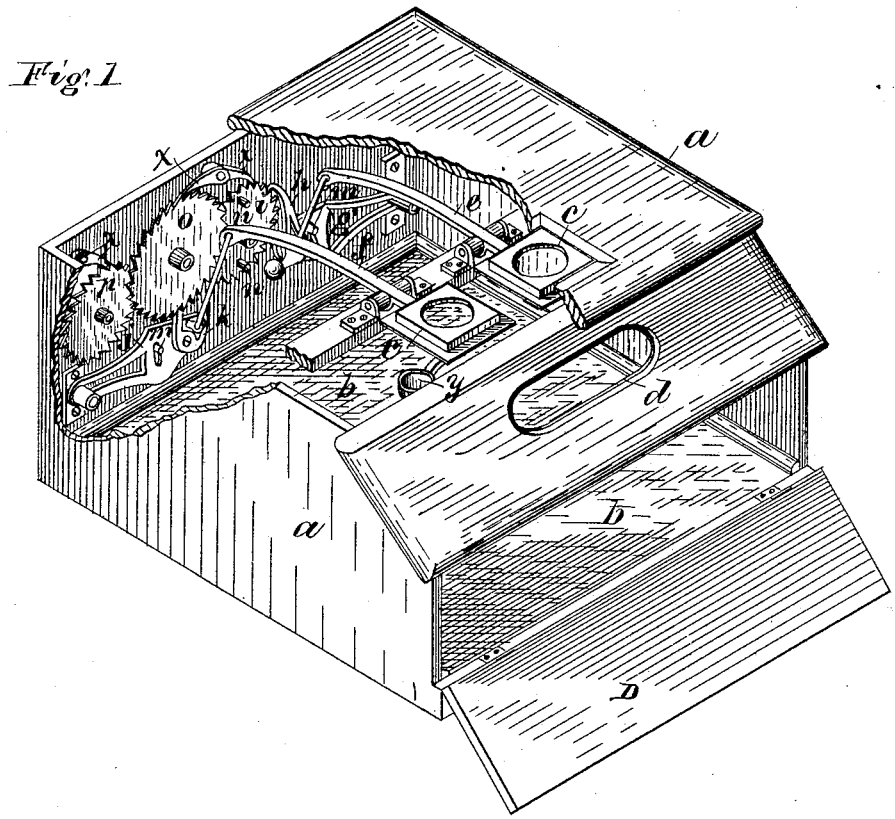
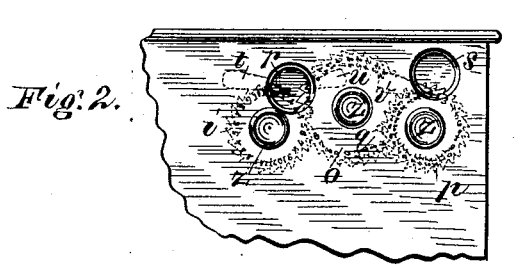

(No Model.) 2 Sheets—Sheet 2.

H. SCHELLENBERG & E. STIEMKE.
EGG REGISTER.

No. 333,678. Patented Jan. 5, 1886.

Witnesses
G. M. Gridley
M. J. Schirmer

Inventors
Herman Schellenberg
Edward Stiemke
By Ernest Benedict
Attorneys

UNITED STATES PATENT OFFICE.

HERMAN SCHELLENBERG AND EDWARD STIEMKE, OF HORN'S CORNERS, WISCONSIN.

EGG-REGISTER.

SPECIFICATION forming part of Letters Patent No. 333,678, dated January 5, 1886.

Application filed February 12, 1885. Serial No. 155,681. (No model.)

*To all whom it may concern:*

Be it known that we, HERMAN SCHELLENBERG and EDWARD STIEMKE, citizens of the United States, residing at Horn's Corners, in the county of Ozaukee and State of Wisconsin, have invented certain new and useful Improvements in Egg - Registers; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention, to be hereinafter distinctly claimed, relates to egg-registers.

The object of the invention and the construction of the device and its method of operation will be readily understood from the following description with reference to the accompanying drawings.

Figure 1 is a perspective view of the egg-register, a part of the top of the case being removed, showing the counting machinery. Fig. 2 is a detail showing parts of the counting device. Fig. 3 is a rear view of the registering machinery.

The same letters refer to like parts in all the views.

The top of the case $a$ has two apertures, in each of which is a frame, $c$, having a round aperture for the reception of an egg. The egg-receiving frames $c\ c$ are rigid on one end of the levers $e$ and $f$, respectively, which levers are each centrally pivoted on a fulcrum within and rigid to the inside of the case. The frames $c\ c$ fit movably into the apertures therefor in the top of the case $a$. The lever $e$, at its end opposite the one carrying the frame $c$, is attached by a connecting-link to the free end of the arm $g$, which arm is pivoted at its other end to the rear side of the case $a$. To the free end of the arm $g$ is also attached the pawl $h$, having a hook at its free end adapted to catch upon the teeth of and rotate the ratchet-wheel $i$. This ratchet-wheel $i$ is supported and rotates upon a pin or arbor rigid upon the inside of the rear side of case $a$.

The adjustments of the lever $e$, arm $g$, pawl $h$, and ratchet-wheel $i$ are such that the depression of that end of the lever $e$ carrying the frame $c$, caused by the weight of a superimposed egg, raises the hook on the free end of the pawl $h$ sufficiently to catch the succeeding tooth on the ratchet-wheel $i$, and when the egg is removed the gravity of the arm $g$ is such as to cause it to drop down, carrying with it the pawl $h$, whereby the wheel $i$ is caused to rotate so much as the distance of one tooth thereon from another tooth thereon.

The lever $f$, at its end opposite to the frame $c$, is attached to the arm $j$ at its free end, which arm is pivoted at its other end upon a pin or arbor rigid to the rear side of the case $a$. To the free end of this arm $j$ is also pivoted the pawl $k$, having its free upper end pointed and adapted to fall into the notches between the teeth of ratchet-wheel $i$.

The adjustments of the lever $f$, arm $j$, pawl $k$, and ratchet-wheel $i$ are such that the depression of the lever $f$, by the weight of an egg placed on its frame $c$, raises the free end of the pawl $k$ a distance equal to the distance between the notches on ratchet-wheel $i$, whereby by such depression of the egg-receiving end of lever $f$ the ratchet-wheel $i$ is pushed forward in its rotation a distance equal to the said movement of the pawl $k$, and when the egg is removed the gravity of the free end of the arm $j$ causes it to drop, carrying the pawl $k$ down one notch on the wheel, and also carrying the thereto attached end of lever $f$.

The upward and downward movements of the arms $g$ and $j$ are limited by the pins $m\ m$, rigid in the rear side of the case $a$, and extending into slots in said levers respectively.

The ratchet-wheel $i$ is provided with twenty-four teeth and corresponding notches, and on the side next to the case the teeth on the wheel are numbered in two series, from one to twelve, inclusive, (one dozen,) and on the opposite side the wheel has the pins $n\ n$, set rigid thereon in such position that as the wheel $i$ rotates each pin will engage with a tooth of the wheel $o$ (hereinafter to be described) at the moment the wheel $o$ is rotated from its tooth numbered 11 to tooth 12, as indicated by a finger hereinafter to be described, and will rotate said wheel $o$ a distance equal to the distance between two adjoining teeth thereon. The wheel $o$ revolves on a pin or arbor rigid on the rear side of the case $a$, and is provided with thirty teeth, numbered thereon from one to thirty, inclusive, said wheel being so located as to overlap the wheel $i$, so that its teeth will engage with the pins $n\ n$ as said wheel $i$ is rotated, and whereby said wheel $o$ will in turn be caused to rotate to the extent of one tooth at each such engagement.

The wheel $p$ rotates on a pin or arbor rigid on the rear side of the case $a$, and is provided with twenty-five teeth, numbered thereon from one to twenty-five, inclusive, said wheel being so located that the wheel $o$ overlaps it slightly, and so that the teeth of said wheel $p$ will engage with a pin, $q$, extending from and rigid to the wheel $o$ on its rear side as said wheel rotates, whereby said wheel $p$ will in turn be caused to rotate to the extent of one tooth at each such engagement.

In the rear side of the case $a$ are two apertures, $r$ and $s$, in which are inserted lights of glass, said apertures being located opposite the wheels $i$ and $o$ and the wheel $p$, respectively, through which glass the figures on those wheels may be readily seen. To the inside of the case $a$ are attached the fingers $t$, $u$, and $v$, having their index ends in front of these glass windows $r$ and $s$ and opposite to the figures on the wheels $i$, $o$, and $p$, respectively. $x\ x\ x$ are pawls, pivoted on the rear side of case $a$, the free ends of which drop into the notches in wheels $i$, $o$, and $p$, respectively, and prevent a backward rotation of said wheels.

Rigidly affixed to each of the frames $c\ c$ is a cup, $y$, into which may be placed so much weight as is necessary to properly adjust the relation of the gravity forces at the respective ends of the levers $e$ and $f$ for the automatic functions to be performed as hereinbefore set forth.

It will be seen that when an egg is placed in and removed from one or in each of the two frames $c\ c$ the wheel $i$, by the gravity of the egg, will be caused to rotate one notch for each egg, and that for each dozen eggs so placed in and removed from one or both frames $c\ c$ the wheel $o$ will be caused to rotate one notch, and that for every thirty dozen (one case) eggs placed in and removed from the frame or frames $c\ c$ the wheel $p$ will be caused to rotate one notch, the said mechanism constituting a device whereby any number of eggs, from a single egg to twenty-five cases of thirty dozen each, may be continuously and accurately registered while being tested as to quality.

Each of the wheels $i$, $o$, and $p$ is provided with a headed rigid stem, $z$, projecting through the rear side of case $a$, whereby said wheels may be adjusted or readjusted from any point of their rotation for beginning a count of eggs or otherwise.

At the front side the case $a$ is provided with a hinged door, D, for convenience in getting at the inside of the case for adjusting or repairing the apparatus, or other purpose, as may be needed.

What is new, and desired to be secured by Letters Patent, is—

1. The case $a$, in combination with lever $e$, provided with egg-receiving frame $c$, arm $g$, pivoted at one end to case $a$ and attached at its other end to the rear extremity of lever $e$, pawl $h$, pivoted to arm $g$ and catching on the teeth of ratchet-wheel $i$, ratchet-wheel $i$, and ratchet-wheel $o$, rotated by contact with wheel $i$, the said wheels $i$ and $o$ being provided with numerals and adapted for counting and registering, substantially as described.

2. The case $a$, in combination with levers $e$ and $f$, provided with frames $c\ c$, said levers being respectively connected to arms $g$ and $j$, the arms $g$ and $j$, the thereto pivoted pawls $h$ and $k$, and the ratchet-wheel $i$, substantially as set forth.

3. The case $a$, in combination with levers $e$ and $f$, (connected to arms $g$ and $j$,) arms $g$ and $j$, pawls $h$ and $k$, ratchet-wheel $i$, provided with pins $n\ n$, and the ratchet-wheel $o$, substantially as and for the purpose set forth.

4. The case $a$, in combination with levers $e$ and $f$, (attached to arms $g$ and $j$, respectively,) arms $g$ and $j$, pawls $h$ and $k$, ratchet-wheel $i$, provided with pins $n\ n$, the ratchet-wheel $o$, provided with pin $q$, and the wheel $p$, substantially as set forth.

5. The case $a$, in combination with centrally-pivoted levers $e$ and $f$, provided with frames $c\ c$ and attached to arms $g$ and $j$, respectively, arms $g$ and $j$, pawls $h$ and $k$, ratchet-wheel $i$, provided with pins $n\ n$ and with numbered teeth, the ratchet-wheel $o$, provided with pin $q$ and with numbered teeth, the ratchet-wheel $p$, having numbered teeth, index-fingers $t$, $u$, and $v$, and the pawls $x\ x\ x$, substantially as and for the purpose set forth.

In testimony whereof we affix our signatures in presence of two witnesses.

HERMAN SCHELLENBERG.
EDWARD STIEMKE.

Witnesses:
MATTHEW J. SCHINNER,
C. T. BENEDICT.